Figure 1:
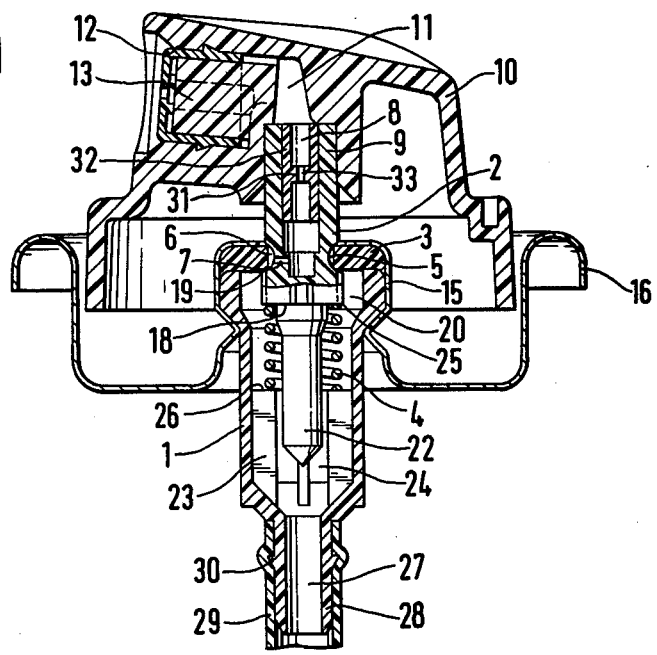

United States Patent [19]

Heeb et al.

[11] Patent Number: 4,466,838
[45] Date of Patent: Aug. 21, 1984

[54] PRESSURIZED CARRIER MIXTURE FOR AEROSOL PREPARATIONS

[75] Inventors: Dieter Heeb; Günter Bechmann; Uwe Bergemann; Volker Böllert; Claus-Dieter Frenzel, all of Hamburg, Fed. Rep. of Germany

[73] Assignee: Hans Schwarzkopf GmbH, Hamburg, Fed. Rep. of Germany

[21] Appl. No.: 498,033

[22] Filed: May 31, 1983

Related U.S. Application Data

[63] Continuation of Ser. No. 324,712, Nov. 24, 1981, abandoned, which is a continuation of Ser. No. 94,127, Nov. 14, 1979, abandoned.

[30] Foreign Application Priority Data

Nov. 15, 1978 [DE] Fed. Rep. of Germany ....... 2849590

[51] Int. Cl.$^3$ ............................ C08K 5/05; C08K 5/06
[52] U.S. Cl. ........................................ 106/311; 424/45
[58] Field of Search ........................... 424/45; 106/311

[56] References Cited

U.S. PATENT DOCUMENTS

| | | | |
|---|---|---|---|
| 3,948,817 | 4/1976 | Grothoff | 252/522 |
| 4,134,968 | 1/1979 | Stebles | 424/47 |
| 4,145,411 | 3/1979 | Mende | 424/45 |
| 4,243,548 | 1/1981 | Heeb et al. | 252/305 |

FOREIGN PATENT DOCUMENTS 42-25051  4/1967  Japan .

Primary Examiner—Paul Lieberman
Assistant Examiner—Amelia B. Yarbrough
Attorney, Agent, or Firm—Beveridge, DeGrandi & Kline

[57] ABSTRACT

A pressurized carrier mixture for aerosol preparations of a self-propelling spray system, for use as a universal spray based on the active ingredients to be applied, organic solvents, water and propellants in a spray container. The carrier mixture is present as a homogeneous solution containing: 70.0–50.1 percent by weight of water; 38.5–28.7 percent by weight of dimethyl ether; 0.5–10.0 percent by weight of isopropanol and/or ethanol and/or n-propanol; and 1.4–0.8 percent by weight of carbon dioxide.

10 Claims, 13 Drawing Figures

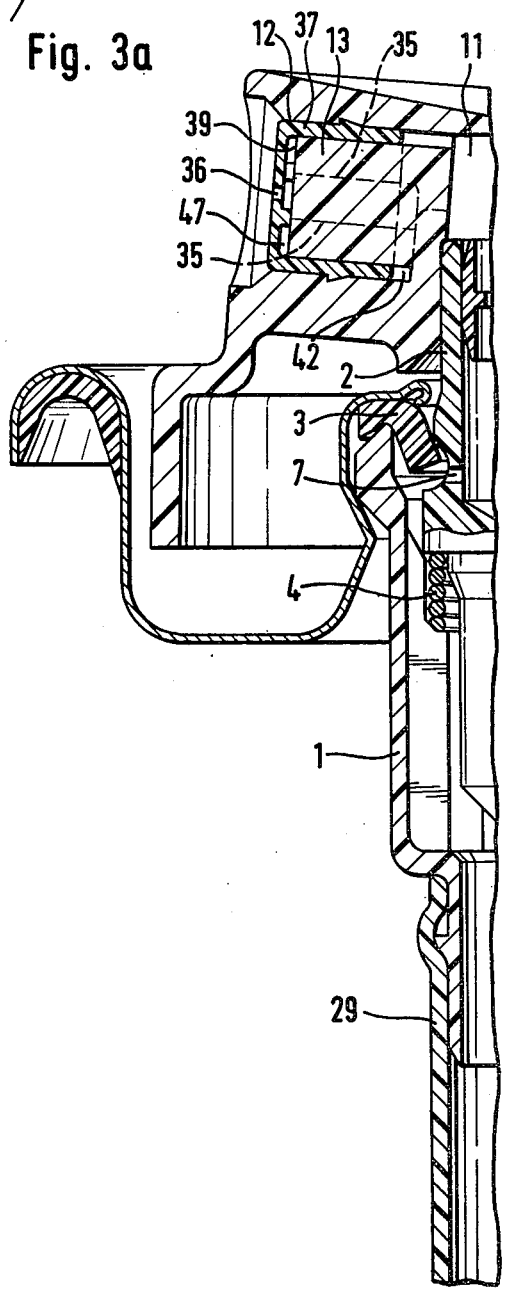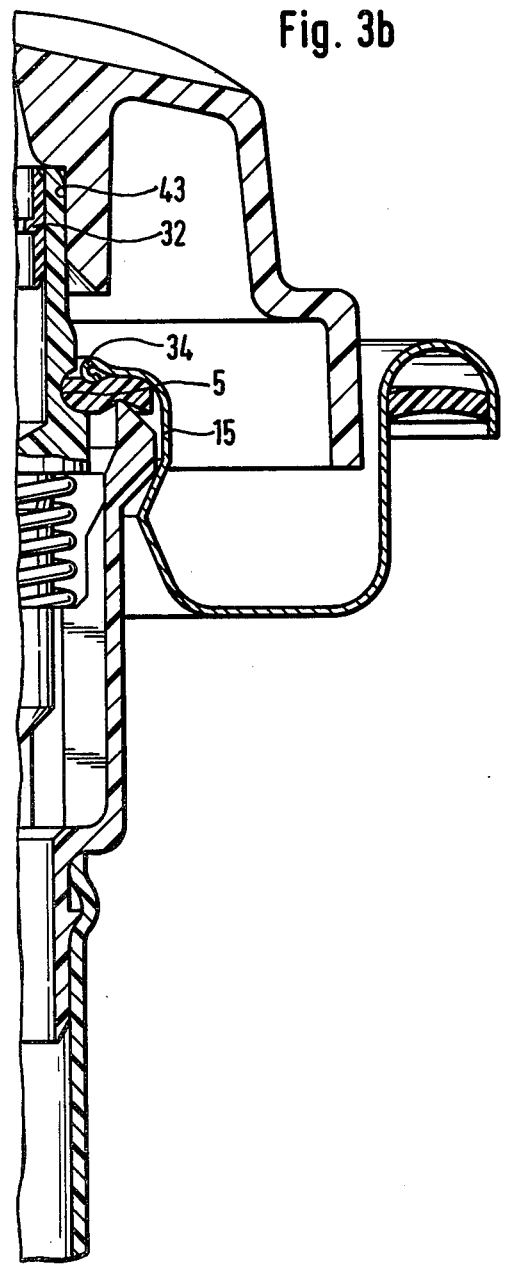

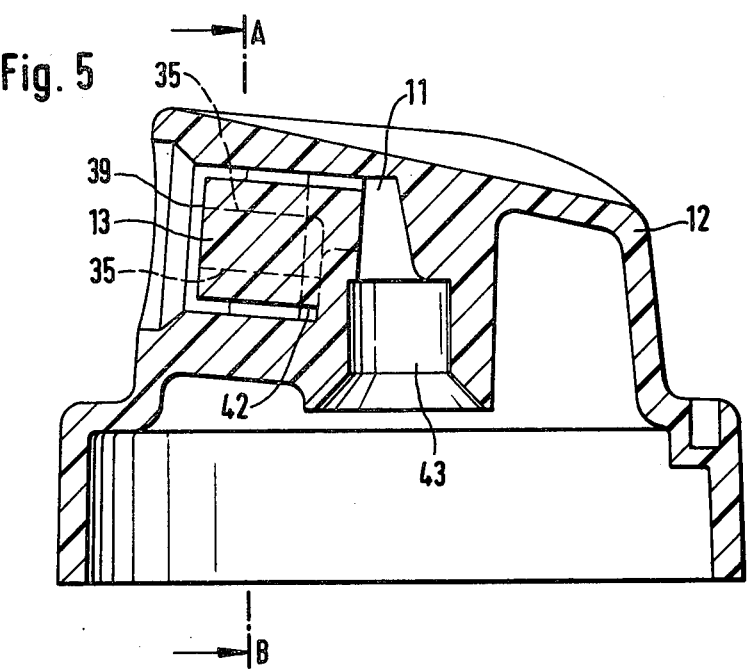
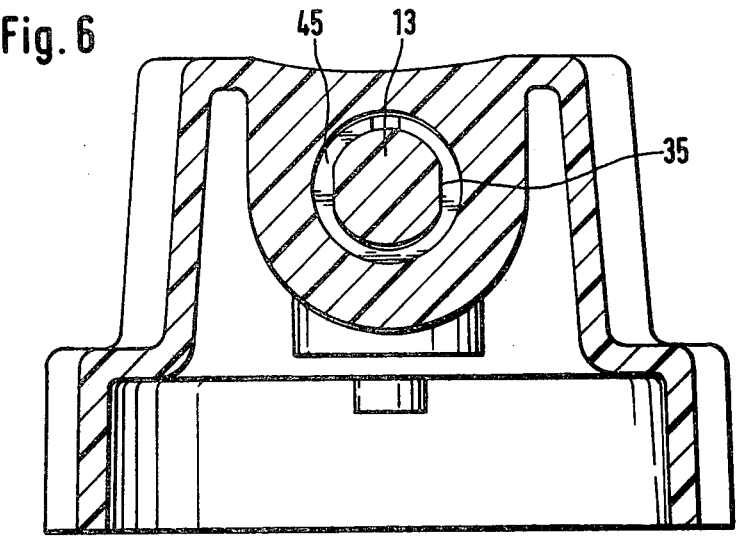

PRESSURIZED CARRIER MIXTURE FOR AEROSOL PREPARATIONS

This is a continuation of application Ser. No. 324,712, filed Nov. 24, 1981, which was in turn a continuation of application Ser. No. 94,127 filed Nov. 14, 1979 and both now abandoned.

The present invention relates to a pressurised carrier mixture for aerosol preparations of a self-propelling spray system, for use as a universal spray, in particular in cosmetics, for use in rooms and/or in medicine, based on the active ingredients to be applied, organic solvents, water and propellants in a spray container, preferably in an aerosol can with a super-fine atomisation valve, and to a process for the manufacture of the carrier mixture, according to the invention, for aerosol preparations, and to a device which is suitable in the production of the carrier mixture and in its use as an aerosol preparation.

Numerous self-propelling spray systems are already known. Thus, U.S. Pat. No. 3,387,425 describes a process for the manufacture of aerosol packs, wherein the agent to be applied is filled as a liquid concentrate into a spray can, the spray can is then closed with a valve and, as the propellant, a saturated solution of a compressed gas which is selected from the group comprising carbon dioxide, nitrous oxide and nitrogen in a normally gaseous, liquefied chlorofluorinated saturated aliphatic hydrocarbon is filled in through the valve closure. In this process, dichlorodifluoromethane, trichloromonofluoromethan, dichlorotetrafluoroethane and mixtures thereof are used as the chlorofluorinated saturated aliphatic hydrocarbons. For reasons of environmental pollution, attempts are being made to prohibit the use of chlorofluorinated hyrocarbons of this type.

German Auslegeschrift No. 2,327,067 describes a mixture of carbon dioxide and solvents as a propellant, active ingredients and solvents for the active ingredients, which mixture is to be sprayed from pressurised gas containers as a hair spray, body spray or room spray and which is characterised in that the mixture contains, as the propellant, acetone and/or diethyl carbonate, into which 1 to 15% of carbon dioxide have been injected up to a saturation pressure of 6 atmospheres gauge. This spray has a high content of inflammable constituents. German Offenlegugnsschrift No. 2,705,872 which corresponds to U.S. Pat. No. 4,134,968 describes an aerosol which contains a liquid mixture of a hydrocarbon propellant, water and an organic solvent and which is characterised in that the liquid mixture forms a single phase and essentially consists of:

(a) 5 to 30 percent by weight of a hydrocarbon propellant which gives a pressure of 1.5 to 8.5 kg/cm$^2$ at 25° C. in the aerosol container,
(b) 5 to 30 percent by weight of water,
(c) 10 to 40 percent by weight of methylene chloride and/or 1,1,1-trichloroethane and
(d) at least 37 percent by weight of ethanol, n-propanol and/or iso-propanol.

According to the statements on page 5 of that publication, at least 95 percent by weight of the liquid mixture must be formed from the stated constituents (a) to (d), but minor amounts of other organic liquids can be present, provided that they do not have a significant adverse effect on the properties of the agent. Examples mentioned are dimethoxymethane, ethyl acetate, acetone, dimethyl ether, diethyl ether, 2-methoxyethanol, 2-ethoxyethanol or a butanol. Additionally to the hydrocarbon propellant, compressed gases, such as, for example, carbon dioxide and/or dinitrogen monoxide, can be contained in the aerosol. This known aerosol which contains 5 to 30, preferably 10 to 20, percent by weight of a hydrocarbon propellant in order to achieve a pressure of 1.5 to 8.5 kg/cm$^2$ at 25° C. in an aerosol container, however, has the disadvantage that, when it is produced from the components a, b, c and d, where the selection is made in such a way that the conditions indicated in Patent Claims 1 to 4 are adhered to, single-phase aerosols with at least 55 percent by weight of non-inflammable constituents can never be obtained, as the Applicant has found when repeating the work. This is still impossible if the minor amounts of other organic solvents and/or compressed gases, mentioned there on page 5, are also used. The aerosol preparation according to the invention, however, does not contain any hydrocarbon propellant.

Japanese Laid-open Application No. Sho 46-28,440 describes a single-phase aerosol composition of (a) 1 to 5% by weight of a pesticide, (b) 0 to 20% by weight of a shortchain alcohol having 2 to 3 carbon atoms, ethylene glycol monoalkyl ether having 1 to 4 carbon atoms in the alkyl radical or diethylene glycol monoalkyl ether having 1 to 4 carbon atoms in the alkyl radical, (c) 1.5 to 15% by weight of a polyoxyethylene alkylaryl ether having 8 to 18 polyoxyethylene radicals or polyoxyethylene ethers of higher alcohols, having 6 to 15 polyoxyethylene radicals, (d) 20 to 50% by weight of water and (e) 20 to 50% by weight of dimethyl ether. The drying times of the sprayed aerosol are very long when compared with the drying times of comparable aerosols based on fluorohydrocarbons as propellant gases. In Japanese Laid-open application No. Sho 47-22,599, an aerosol of a styling dispersion for hair care is described, which aerosol contains a mixture which, for dispersing an appropriate quantity of a styling agent in water, was prepared by dispersing an organic amine, wetting agent, thiourea or urea as well as perfume in the aqueous solution of a cationic resin, contains 20 to 50% by weight of dimethyl ether, relative to the dispersion, as an additive, and has been filled into the spray can and sealed. The disadvantage of this aerosol preparation is that it is a dispersion and not a clear solution.

It is the object of the present invention to provide a pressurised carrier mixture for aerosol preparations of a self-propelling spray system, for use as a universal spray, in particular in cosmetics, for use in a room and/or in medicine, based on the active ingredients to be applied, organic solvents, water and propellants in a spray container, preferably in an aerosol can having a super-fine atomisation valve, an to provide a process for the manufacture of the carrier mixture, according to the invention, for aerosol preparations and to provide a device which is suitable in the production of the carrier mixture and its use as an aerosol preparation, which carrier mixture 1. is present in the pressurised-gas container as a stable homogeneous solution—that is to say as a single liquid phase—so that, in use, the spray is always dispensed in the same composition,
2. has the greatest possible proportion of non-inflammable constituents in the solution so that, as far as possible, transport, storage and use can be free from accident risk and the environment cannot be polluted, 3. is free from chlorofluorinated hydrocarbons and hydrocarbn propellant gases, 4. is free from chlorinated hydrocarbons, for example methylene chloride and/or 1,1,1-trichloroethane, 5. has drying times and spraying properties, at least when a specially adapted pressure valve is used, which largely correspond to the known aerosol preparations based on fluorochlorohydrocarbon propellant gases, and, 6. according to the conventional methods for measuring a flame jet, does not give a flame jet and does not contain more than 45 percent by weight of inflammable constituents.

The subject of the invention is a pressurised carrier mixture for aerosol preparations of a self-propelling spray system, for use as a universal spray based on the active ingredients to be applied, organic solvents, water and propellants in a spray container, characterised in that the carrier mixture is present as a homogeneous solution containing 70.0–50.1 percent by weight of water, 38.5–28.7 percent by weight of dimethyl ether, 0.5–10.0 percent by weight of iso-propanol and/or ethanol and/or n-propanol and 1.4–0.8 percent by weight of carbon dioxide, wherein the percentage by weight data must add up to 100 percent by weight.

In the sense of this invention, non-inflammable constituents are understood to be water, carbon dioxide and those other constituents, for example active ingredients, which have an ignition temperature above 600° C.

The carrier mixtures, according to the invention, of the aerosol preparations can be formulated with cosmetic, hygienically or medically acive constituents (active ingredients) and yield preparations for diverse purposes, for example as a cosmetic spray, room spray or medicinal spray, preferably deodorant sprays.

The active constituents contained in the preparations can, for example, be hair-care substances, hairspray resin, antiperspirants, deodorants, bactericides, perfume, fungicides, plant extracts and/or organ extracts.

The aqueous carrier mixture used in the aerosol preparations according to the invention is based on the propellant gases carbon dioxide ad dimethyl ether as the propellant.

An embodiment of a carrier mixture is characterised in that it contains, as the propellant gases, 0.8–1.1 percent by weight of carbon dioxide and 28.7–38.5 percent by weight of dimethyl ether, the percentages by weight relating to the total weight of the aqueous carrier mixture.

Another embodiment of the carrier mixture is characterised in that it contains 54.0–70.0 percent by weight of water, the percentages by weight relating to the total weight of the aqueous carrier mixture.

A further embodiment of the carrier mixture is characterised in that it contains 5.0–10.0 percent by weight of alcohols having 2 and/or 3 C atoms, the percentages by weight relating to the total weight of the aqueous carrier mixture.

A particularly preferred embodiment of the carrier mixture is characterised in that the carrier mixture contains 54.0–55.0 percent by weight of water, 0.9–1.1 percent by weight of carbon dioxide, 38.5–35.1 percent by weight of dimethyl ether and 9.0–6.4 percent by weight of alcohols having 2 and/or 3 C atoms, wherein the percent by weight data must add up to 100 percent by weight.

In the manufacture of the carrier mixture or the aerosol preparations according to the invention, the nature and amount of required active ingredient, alcohols of the stated types, carbon dioxide, dimethyl ether and water are, taking into account the intended use, qualitatively and quantitatively matched in a trial batch in such a way, taking into account the ranges of percentages by weight indicated above, that a homogeneous solution is formed as a single phase which can be sprayed perfectly to give a ready-to-use aerosol.

In carrier mixtures prepared for aerosol preparations of the above particularly preferred embodiment of the content of non-inflammable constituents was 55.1–55.9 percent by weight. Compared with the state of the art according to German Offenlegungsschrift No. 2,705,872, Example 2, with a maximum of 40 percent by weight of non-inflammable constituents, this means an advance by a major step-change. For this reason, the aerosol preparations according to the invention are used in transport, storage and application as a product of low accident risk for the intended purpose, so that it can be called a "safety aerosol preparation".

A process for the manufacture of a carrier mixture for ready-to-use aerosol preparations according to the invention is characterised in that the active ingredients, water and organic solvents are processed to give a mixture and a requisite part quantity is filled into a pressure-spray container and the pressure-spray container is then closed so that, after dimethyl ether and then carbon dioxide have been filled in under pressure, the liquid filling is then present as a single-phase homogeneous solution.

A further subject of the invention is a device which is intended, on spraying, to impart a suitable fine droplet distribution to the carrier mixture and the aerosol preparations produced therefrom, since aerosol sprayed from hitherto known devices of similar construction are felt by the users to be excesively wet.

This object of the present invention was achieved, starting from the self-closing spray valve, described in German Patent Specification No. 1,575,851, for pressure containers which contain solutions of a gas and/or liquid, when a special restrictor has been located in the valve stem part and, additionally, the spray head has been designed in a special way.

The subject of the invention is an aerosol can with a self-closing spray valve, for pressure containers which contain solutions of a gas and/or liquid, having a valve stem which, inside a valve housing, is axially movable in the driection of opening against the action of a closing compression spring which is backed up by the valve housing, an axial outlet channel in the valve stem being connected to the interior of the pressure container by means of a radial outlet channel which ends in an annular groove in the valve stem, the radial outlet channel thereof being sealed, in the closed position, by an elastic annular grommet, the cylindrical internal circumference of which engages in the annular groove with a radial bias and the external edge of which is not clamped between the valve housing and the dome of the cap, the shoulder, which faces the container, of the annular groove, when in the closed position, being in tight contact with the grommet under the action of the closing compression spring, whilst the forces which are exerted by the annular groove in the valve stem on the circumferential sections, which are above the neutral bending zone, of the hole in the grommet are composed of a force component which is in each case radial to the valve stem and of a force component which is parallel to the axis, which components are greatest at the upper edge, and, when the valve is closed, the forces which are exerted by the annular groove in the valve stem on the circumferential sections, which are below the neutral bending zone, of the hole in the grommet are also composed of a force component which is radial in each case to the valve stem and of a force component which is parallel to the axis, these force components being greatest at the lower edge of the hole of the grommet, characterised in that (a) a restrictor in the shape of a body with a cylindrical bore is located in compression in the axial outlet channel of the valve stem part and, in the centrally arranged restricting channel, a bridge member is provided which is located in the centre of the restrictor and contains the passage orifice, (b) the turbulent-spray head with the inserted turbulence jet is firmly but releasably attached and the srpay head has a cylindrical jet-receiving plug having two surfaces which are parallel to the axis and, as viewed from the jet orifice, are vertically arranged, (c) the jet-receiving plug carries the forced-on turbulence jet, four raised webs of which rest on the end face of the jet-receiving plug (d) thr four webs around the jet orifice on the inside of the turbulence jet form an approximately cylindrical turbulence chamber and the webs free the inlet channels which are in a loction tangential to the circular jet orifice, (e) a cylindrical recess is located on the outer surface of the turbulence jet, concentrically to the jet orifice, and (f) the turbulent-spray head contains an approximately eccentrically arranged, tapering chamber which communicates with the annular channel and merges into the receiving opening which is located underneath and is to receive the valve stem part.

Figure 2:
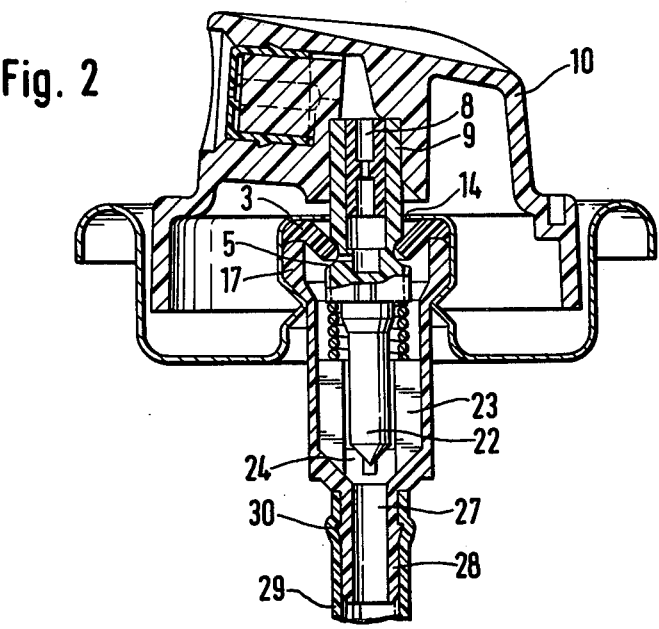
Figure 4:
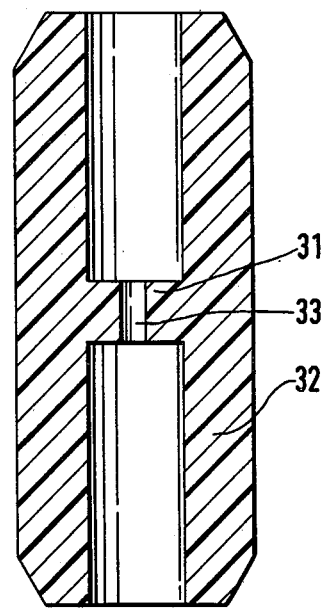
Figure 7:
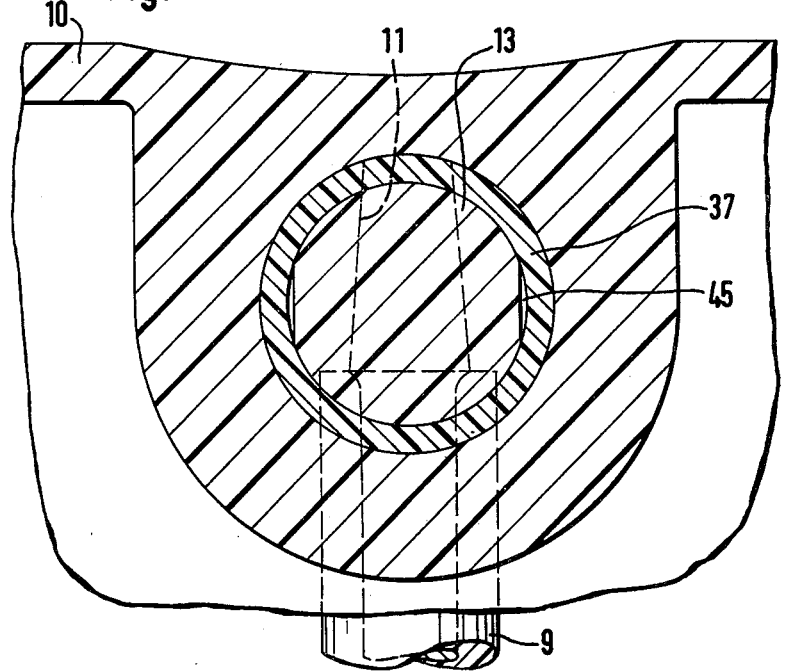
Figure 8:
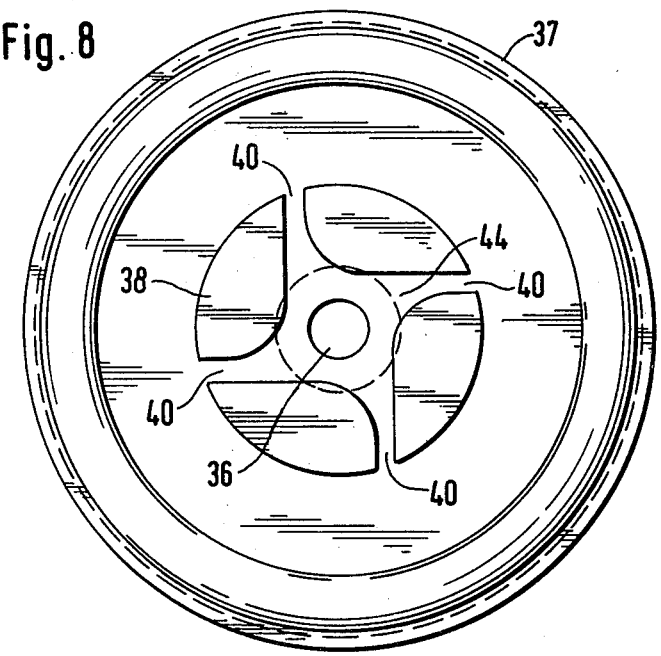
Figure 9:
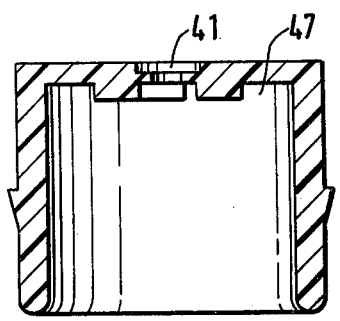
Figure 10:
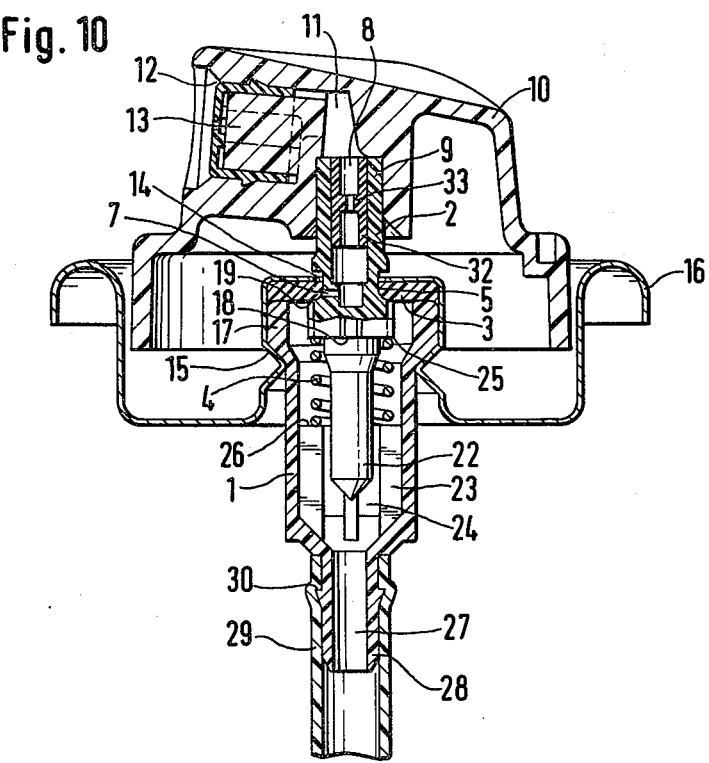
Figure 11:
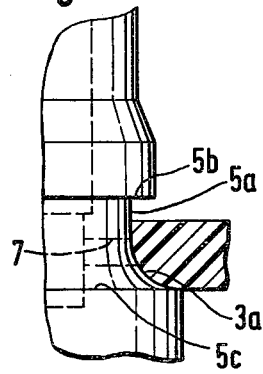
Figure 12:
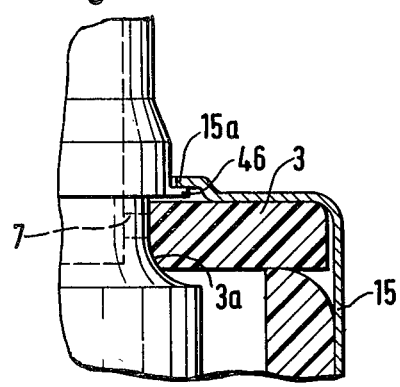
Figure 13:
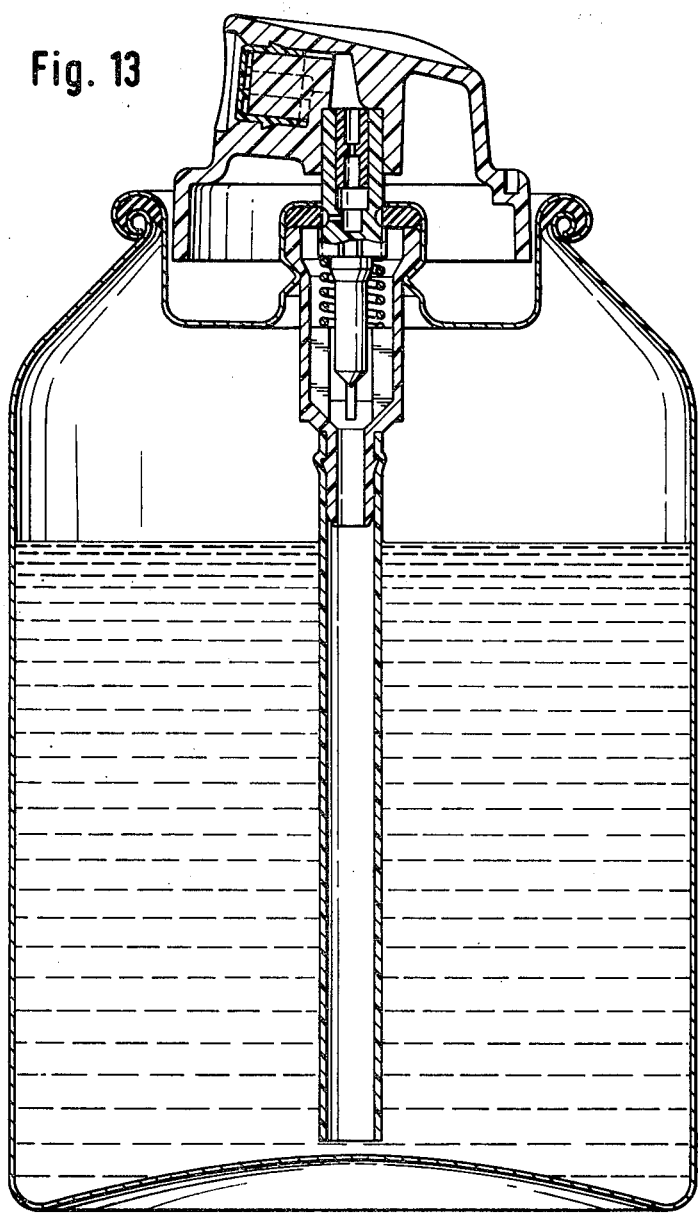

In the drawings, namely FIGS. 1 to 13, the aerosol can is explained by reference to the illustrative embodiments represented, in which:

FIG. 1 shows a spray valve in the closed state, in a vertical longitudinal section, FIG. 2 shows the spray valve according to FIG. 1 in the opened state, FIG. 3 shows another embodiment of a spray valve in a vertical longitudinal section, the spray valve being in the opened state in the left-hand half of the longitudinal section and being in the closed state in the right-hand half of the longitudinal section, FIG. 4 shows a restrictor in a vertical longitudinal section, FIG. 5 shows a vertical longitudinal section of a turbulent-spray head, FIG. 6 shows a vertical longitudinal section through the turbulent-spray head shown in FIG. 5 along the cut A-B, FIG. 7 shows a sectional drawing through the jet-receiving plut of the turbulent-spray head, with the jet inserted, FIG. 8 shows a view of the internal bottom of the inserted jet, FIG. 9 shows a vertical longitudinal section through the inserted jet partially shown in FIG. 8, FIG. 10 shows another embodiment of a spray valve in longitudinal section, FIG. 11 is a cut-out from FIG. 10 on an enlarged scale, FIG. 12 shows a modification of the embodiment according to FIG. 10 and FIG. 11, and FIG. 13 shows a longitudinal section of an aerosol spray can which contains a spray valve of the type described in FIGS. 1 to 12 and which is filled with an aerosol preparation.

FIGS. 1 and 2 illustrate a self-closing spray valve for a pressure container, which is not shown, containing an aerosol preparation which comprises a solution of gas/-liquid, for example liquefied propellant gas, which spray valve essentially consists of a housing 1, a valve stem 2, an elastic grommet 3 and a closing spring 4. The valve stem 2 is movable in the direction of opening against the action of the closing compression spring 4 and the elasticity of the grommet. The edge of the hole of the grommet 3 is inserted with a radial bias in an annular groove 5 of the valve stem the greatest width of the groove being about one third greater than the thickness of the grommet. In the closed position of the valve, in FIG. 1, the forces which are simulatneously exerted by the annular groove 5 in the valve stem 2 on the circumferential sections, which are above and below the neutral bending zone, of the hole in the grommet 3 are composed of a force component which is in each case approximately radial to the valve stem 2 and of a force component which is approximately parallel to the axis. Due to the profiled shape of the annular groove, the two force components are here greatest at the upper and lower edge of the hole of the grommet. In the illustrative embodiment in FIGS. 1 and 2, this is achieved by an annular groove which, in transverse profile, has approximately the shape of a circular arc. The profile of the annular groove can, however, also have the shape of a catenary or of a parabola or the like or it can also be shaped in the form of a V. The essential point is merely that, in the zones, facing the container and facing away from the container, of the edge of the hole in the grommet, there is a particularly high specific surface pressure, by means of which an especially good sealing effect is achieved both at the upper inner edge and at the lower inner edge. As a function of the radial bias and the nature of the material for the grommet, an annular space 6 can be formed between the bottom of the annular groove 5 and the cylindrical inner surface of the hole in the grommet. However, even if a highly elastic material, completely filling the groove, is used for the grommet, the intended purpose of an increased specific surface pressure is fulfilled by the decomposition of forces, provided according to the invention, by means of the annular groove at both the upper and the lower edge of the hole.

The annular groove 5 covers at least one radial outlet channel 7 which, in the direction of flow of the solution of gas/liquids, ends in an axial outlet channel 8 of the vale stem 2, which axial outlet channel starts in the zone of the radial outlet channel 7 and is open only towards the outer end.

A turbulent-spray head 10, consisting of plastic, with an inserted turbulence jet 37 is firmly but releasably attached to the valve stem part 9 surrounding the axial outlet channel 8. The trubulent-spray head 10 consists—as can be seen in particular from FIGS. 5 to 9—of the spray head 12 (without jet) with a cylindrical jet-receiving plug 13 which has two surfaces 35 which are parallel to the axis and, as viewed from the jet orifice 36, are vertically arranged. The jet-receiving plug 13 carries the forced-on turbulence jet 37, four raised webs 38 of which rest on the end face 39 of the jet-receiving plug 13. The four webs 38 form an approximately cylindrical turbulence chamber 44 around the jet orifice 36 on the inside of the turbulence jet 37. The webs 38 mutually free the inlet channels 40 which are in a location tangential to the circular jet orifice 36. The webs 38 have a cylindrical outside which is interrupted by the inlet channels 40. A cylindrical recess 41 is located on the outer surface of the turbulence jet 37, concentrically to the jet orifice 36. The turbulent-spray head 10 contains a somewhat eccentrically arranged, tapering chamber 11 which communicates with the annular channel 42 and merges into the receiving opening 43 which is located underneath and is to receive the valve stem part 9. A restrictor 32, which is shown particularly clearly in FIG. 4, in the shape of a cylindrical body with a bore is located in compression in the axial outlet channel 8 of the valve step part 9. The centrally arranged restricting channel 33 is provided in a bridge member 31 located in the centre of the restrictor 32. The passage orifice 27 has a size of about 2.0 to 3.0 mm, preferably 2.5 mm. The diameter of the radial outlet channel 7 in the valve stem 2 can be about 0.2 to 0.3 mm, preferably 0.25 mm. The restricting channel 33 in the bridge member 31 has a length/diameter (l/d) ratio of 1.0 to 3.0, the diameter being of the order of magnitude of the radial outlet channel 7. The height of the bridge member 31 is approximately one tenth of the length of the restrictor 32, the diameters of the inlet and outlet openings of the restrictor 32 being 0.5 mm to 1.0 mm, preferably 0.8 mm. The passage channel 45 between the jet-receiving plug 13 and the turbulence jet 37, which passage channel is formed by the surfaces 35 on the jet-receiving plug 13 and the inner wall of the turbulence jet 37, has at its maximum point a width of 0.15 to 0.25 mm, preferably 0.20 mm. The length of this passage channel 45 is about 3.5 mm. The front annular channel 47 on the end face 39 of the jet-receiving plug 13 has an external diameter of about 4 mm and an internal diameter which is formed by the cylindrical outline of the webs 38. This internal diameter is 2 to 3 mm and the front annular channel 47 has a channel weight which is equal to the web height and specifically is 0.2 to 0.3 mm, preferably 0.25 mm. The inlet channels 40 are 0.15 to 0.30 mm wide and have the height of the webs 38. The turbulence chamber 44 has an approximately cylindrical diameter of 0.70 to 1.30 mm, preferably 0.90 mm. The height of the turbulence chamber 44 is equal to the height of the webs 38. The jet orifice 36 has a length/diameter (l/d) ratio of 0.3 to 1.0, preferably about 0.5, the diameter being 0.3 to 0.6, preferably 0.5, mm. The cylindrical recess 41 has a diameter of about 1 mm and a depth of 0.2 mm.

The outer valve stem part 9 surrounding the axial outlet channel 8 protrudes through a central opening 14 into the dome 15 of a container lid 16. The valve housing 1 is inserted in the dome and its end face, which is chamfered on the outside and faces the central opening 14 in the dome, firmly and tightly clamps the outer edge of the grommet against the inside of the dome by pressing the cylindrical part of the dome in under a part 17, of widened diameter of the valve housing.

On the side of the annular surface 18, facing the container, an inner guide stem part 22 of greatly reduced diameter is guided to be axially displaceable on guide jaws 23 provided within the valve housing 1. The guide jaws are joined to the inner wall and the bottom of the valve housing 1 and are shaped as relatively narrow ribs. Between them, they enclose interspaces which form connection channels 24 between the interior of the container and the interior of the valve housing.

The two ends of the closing compression spring 4 surrounding the guide stem part 22 are backed up by the end face of the annular surface 18, facing the container, on an annular shoulder 25 and by the end face 26, facing the annular shoulder, of the guide jaws 23 of the valve housing. In the zone of the outer end of the closing compression spring 4, bearing against the annular shoulder 25, the diameter of the inner guide shaft 22 of the valve cone is adapted over a small length approximately to the internal diameter of the closing compression spring, the external diameter of which corresponds approximately to that of the outer valve stem part 9. The main section of the inner guide stem part 22 has a smaller dimension than the internal diameter of the closing compression spring 4, in order to avoid friction between the parts which move relative to one another. Advantageously, the guide jaws 23 also possess, in the zone of their end face 26 facing the closing compression spring, projections which are not shown and surround the outside of the inner end of the closing spring and by means of which the end of the spring is fixed.

In the bottom, the valve housing 1 is provided with a passage orifice 27 which ends in a projection 28, pointing into the container, for a dip tube 29 pushed over the latter. The projection 28 can be provided with a toothshaped annular collar 30, by means of which a notchlike connection between the dip tube and the projection 28 is obtained.

The embodiment shown in FIG. 3, is distinguished in that the upper edge of the valve housing 1 is formed obliquely, rising from the outside. The central opening 14 in the dome of the disc has an internal roll 34 located by beading. The outer valve stem part 2 is formed with a smaller diameter, compared with the valve stem 2.

The embodiments shown in FIGS. 10, 11 and 12 differ from the embodiment shown in FIGS. 1 and 2 in that the bottom 5a of the annular groove 5 in the valve stem 2 encloses an approximately right angle with the upper side wall 5b of the groove, facing away from the container and being approximately perpendicular to the main axis of the valve stem. On the side facing the container, the bottom 5a extends conically and radially downwards and outwards. It can be seen from the groove profile according to FIGS. 11 and 12 that the bottom extends cylindrically over approximately the upper third of the width of the groove and then has the shape of a downward circular arc. In place of a line in the form of an exact circular arc, the groove can also run out on the underside in the form of a different arcuate line. The essential point is that, in the zone of the edge 3a, facing the container, of the hole in the elastic grommet 3, a particularly great specific surface pressure is achieved in order to obtain a high sealing effect.

In the embodiment according to FIG. 11, it is advantageous to place the radial passage channel 7 in the valve stem 2 likewise into the zone of the annular groove, exposed to the axial and radial force components. Accordingly, the distance between the centre line of the passage channel 7 and the lower line of intersection between the groove ending in the shape of an arc and the cylindrical shell surface of the section of the valve stem 2, located underneath, is about one fifth of the total width of the groove between the line 5c of intersection and the upper axial transverse shoulder 5b. In this way, the radial and axial force components, which are caused by the closing force of the compression spring 4 for the purpose of an increased surface pressure in the zone of the radial passage channel 7, are added to the radial bias, under which the grommet engages in the groove.

In the embodiment according to FIG. 12, the valve stem 2 has, in order to determine its closing position accurately even if the grommet 3 is swollen, at least one radially projecting surface 46 immediately above its annular groove, which projecting surface bears, as a stop, against the inside of the dome 15, enclosing the valve housing 1, of a container lid 16. In this case, it would be advisable to place the radial passage channel 7 somewhat higher up since, due to the closing position being always exactly determined, the upper edge of the hole of the grommet 3 is in the vicinity of the upper axial transverse shoulder 5b. In order to ensure an accurately plane position of the grommet even in the zone of restrictor and in the chamber space 11. The mixture which has already been worked into the form of droplets flows from the chamber 11 into the annular channel 42, is divided there into two streams axial to the jet-receiving plug 13 and reaches the inlet channels through the passage channels 45 via the front annular channel. The four inlet channels 40 in turn act as restrictors and at the same time cause a rotary flow of the mixture to be formed in the turbulence chamber. As a result of both the expansion into the turbulence chamber and the diffuser effect of the inlet channels 40, the droplet size of the two-phase mixture is repeatedly reduced. The jet orifice 36 effects a further restriction with a subsequent expansion. The rotation of the flow in the turbulence chamber continues on emergence from the jet orifice 36 and additionally effects a division of the droplets of the two-phase mixture after they have left the orifice. The decisive point for the form of the spray jet is the length/diameter (l/d) ratio of the jet orifice 36 and the geometry of the cylindrical recess 41 located in front thereof.

TABLE I

Examples of carrier mixtures according to the invention, which form a homogeneous liquid phase

| Constituents | A % by weight | B % by weight | C % by weight | D % by weight | E % by weight | F % by weight | G % by weight | H % by weight | I % by weight | J % by weight |
|---|---|---|---|---|---|---|---|---|---|---|
| Water | 70.0 | 70.0 | 70.0 | 54.0 | 54.0 | 54.0 | 54.0 | 54.70 | 54.0 | 54.42 |
| Dimethyl ether | 28.7 | 28.7 | 28.7 | 35.0 | 35.0 | 38.5 | 38.0 | 35.71 | 35.0 | 37.56 |
| Iso-propanol | 0.5 | | | 10.0 | | | 7.0 | | | 6.92 |
| Ethanol | | | 0.5 | | 10.0 | 6.5 | | 8.57 | 10.0 | |
| n-Propanol | | 0.5 | | | | | | | | |
| Carbon dioxide | 0.8 | 0.8 | 0.8 | 1.0 | 1.0 | 1.0 | 1.0 | 1.02 | 1.0 | 1.10 |
| Pressure in bars | 6.8 | 6.9 | 7.0 | 3.5 | 6.3 | 5.7 | 5.7 | 6.4 | 6.3 | 5.7 |

Examples of carrier mixtures according to the invention, which form a homogeneous liquid phase

| Constituents | K % by weight | L % by weight | M % by weight |
|---|---|---|---|
| Water | 54.0 | 54.0 | 54.0 |
| Dimethyl ether | 35.0 | 38.0 | 38.5 |
| Iso-propanol | 1.0 | 6.0 | |
| Ethanol | 8.0 | | 5.5 |
| n-Propanol | 1.0 | 1.0 | 1.0 |
| Carbon dioxide | 1.0 | 1.0 | 1.0 |
| Pressure in bars | 6.0 | 5.7 | 5.7 |

The carrier mixtures according to the invention have a pressure of about 5 to about 7 bars at 20° C.

the edge of its hole, the edge 15a, delimiting the opening 14 for the valve stem 2, of the dome 15 of the container lid 16 is pressed upwards during the manufacture of the container lid by the height of the radial projection of the valve cone, forming the abutment surface 34.

In use, the turbulent-spray head 10 is pressed down. As a result, the radial outlet channel 7 which is sealed in the rest position by the elastic grommet 3 is lowered and connected to the free annular space. At the same time, the closing compression spring is compressed and tensioned. The medium which is to be sprayed is forced by the internal pressure in the can through the dip tube 29 and the passage orifice 27 through the connecting channels 24 into the free annular space 20 and flows through the radial outlet channel 7. The expansion in the axial outlet channel 8 of the valve stem 2 effects a formation of vapour, whereby the single-phase mixture is transformed into a two-phase mixture. While the flow proceeds through the restrictor 32, in particular through the restricting channel 33, the mixture is compressed and accelerated, as a result of which the droplet size of the mixture is made finer during the expansion after the

EXAMPLE 1

A hair-care product is prepared analogously to the carrier mixture J indicated in Table I. For this purpose, 0.80 g of polyvinylpyrrolidone, 0.10 g of perfume oil and 6.86 g of iso-propanol are filled into a suitable aerosol container. The aerosol container is provided with a spray valve according to FIG. 1 or FIG. 3 or FIG. 10, but without the turbulent-spray head 10. Subsequently, 77.04 g of aqueous dimethyl ether solution (30% by weight of dimethyl ether and 70% by weight of water), 14.11 g of dimethyl ether and 1.09 g of carbon dioxide are injected through the spray valve into the aerosol container. A turbulent-spray head 10 is then placed onto the spray valve. The filled aerosol can is illustrated by FIG. 13.

Due to the use of a carrier mixture and of a device according to the invention, the spray properties of this aerosol villing largely correspond to the properties of corresponding hair-care products which have been formulated with the use of fluorochlorohydrocarbon propellants.

EXAMPLE 2

A deodorant spray preparation according to the following formulation is prepared analogously to the carrier mixture H indicated in Table I:

98.00% by weight of carrier mixture H,
0.10% by weight of a bactericide for deodorant spray (for example 2,4,4'-trichloro-2'-hydroxyphenyl ether),
0.50% by weight of perfume oil,
0.30% by weight of a solubiliser (for example castor oil which has been hydrogenated and ethoxylated with about 40 mols of ethylene oxide per mol) and
1.10% by weight of a superfatting agent for deodorant spray (for example polyethylene glycol having an average molecular weight of 400).

For this purpose,
0.10 g of bactericide for deodorant spray,
0.50 g of perfume oil,
0.30 g of a solubiliser and
1.10 g of a superfatting agent for deodorant spray are dissolved in 8.40 g of ethanol and filled into a suitable aerosol container. The aerosol container is provided with a spray valve according to FIG. 1 or FIG. 3 or FIG. 10, but without the turbulent-spray head 10. Subsequently,
76.57 g of aqueous dimethyl ether solution (30% by weight of dimethyl ether and 70% by weight of water),
12.03 g of dimethyl ether and
1.00 g of carbon dioxide are injected through the spray valve into the aerosol container. The turbulent-spray head 10 is then placed onto the spray valve. The filled aerosol can is illustrated in FIG. 13.

Due to the use of a carrier mixture and of a device according to the invention, the spray properties of this aerosol filling largely correspond to the properties of corresponding deodorant spray products which have been formulated with the use of fluorochlorohydrocarbon propellants.

EXAMPLE 3

An antiperspirant spray preparation having the following formulation is prepared analogously to the carrier mixture I indicated in Table I:
96.7% by weight of carrier mixture I,
3.0% by weight of a perspiration inhibitor (for example aluminium hydroxychloride) and
0.3% by weight of perfume oil.

For this purpose,
3.0 g of a perspiration inhibitor,
0.3 g of perfume oil,
10.0 g of water and
9.67 g of ethanol are dissolved and filled into a suitable aerosol container. The aerosol container is provided with a spray valve according to FIG. 1 or FIG. 3 or FIG. 10, but without the turbulent-spray head 10. Subsequently,
60.31 g of aqueous dimethyl ether solution (30% by weight of dimethyl ether and 70% by weight of water),
15.75 g of dimethyl ether and
0.97 g of carbon dioxide are injected through the spray valve into the aerosol container. A turbulent-spray head 10 is then placed onto the spray valve. The filled aerosol can is illustrated by FIG. 13.

Due to the use of a carrier mixture and of a device according to the invention, the spray properties of this aerosol filling largely correspond to the properties of corresponding antiperspirant spray products which have been formulated with the use of fluorochlorohydrocarbons as the propellant.

Further investigations have shown that, as a result of the appropriate addition of active ingredients and conventional additives, the carrier mixtures H and I in Table I are outstandingly suitable for the manufacture of aerosol preparations for toiletries, hair-care requisites, household articles, medicinal sprays, technical aerosols and perfume-atomising agents.

EXAMPLE 4

A deodorant spray preparation according to the following formulation is prepared analogously to the carrier mixture H indicated in Table I:
98.00% by weight of carrier mixture H,
0.10% by weight of a bactericide for deodorant spray (for example as in Example 2),
0.50% by weight of perfume oil,
0.30% by weight of a solubiliser (for example as in Example 2) and
1.10% by weight of a superfatting agent for deodorant spray (for example as in Example 2).

For this purpose,
0.10 g of a bactericide for deodorant spray,
0.50 g of perfume oil,
0.30 g of a solubiliser and
1.10 g of a superfatting agent for deodorant spray are filled into a suitable aerosol container. The aerosol container is provided with a spray valve according to FIG. 1 or FIG. 3 or FIG. 10, but without the turbulent-spray head 10. Subsequently,
97.00 g of a single-phase aqueous-alcoholic dimethyl ether solution (36.08% by weight of dimethyl ether, 55.26% by weight of water and 8.66% by weight of ethanol) and
1.00 g of carbon dioxide are injected through the spray valve into the aerosol container. The turbulent-spray head 10 is then placed onto the spray valve. The filled aerosol can is illustrated by FIG. 13.

Due to the use of a carrier mixture and of a device according to the invention, the spray properties of this aerosol filling largely correspond to the properties of corresponding deodorant spray products which have been formulated with fluorochlorohydrocarbons as the propellant.

EXAMPLE 5

An antiperspirant spray preparation having the following formulation is prepared analogously to the carrier mixture I indicated in Table I:
96.70% by weight of carrier mixture I,
3.00% by weight of a perspiration inhibitor (for example as in Example 3) and
0.30% by weight of perfume oil.

For this purpose,
3.0 g of a perspiration inhibitor and
0.3 g of perfume oil are filled into a suitable aerosol container. The aerosol container is provided with a spray valve according to FIG. 1 or FIG. 3 or FIG.

10, but without the turbulent-spray head 10. Subsequently, 95.73 g of a single-phase aqueous-alcoholic dimethyl ether solution (35.35% by weight of dimethyl ether, 54.55% by weight of water and 10.10% by weight of ethanol) and 0.97 g of carbon dioxide are injected through the spray valve into the aerosol container. A turbulent-spray head 10 is then placed onto the spray valve. The filled aerosol can is illustrated by FIG. 13.

Due to the use of a carrier mixture and of a device according to the invention, the spray properties of this aerosol filling largely correspond to the properties of corresponding anitperspirant spray products which have been formulated with fluorochlorohydrocarbons as the propellant.

EXAMPLE 6

A hair-care product is prepared analogously to the carrier mixture J indicated in Table I. For this purpose, 0.80 g of polyvinylpyrrolidone and 0.10 g of perfume oil are filled into a suitable aerosol container. The aerosol container is provided with a spray valve according to FIG. 1 or FIG. 3 or FIG. 10, but without the turbulent-spray head 10. Subsequently, 98.01 g of a single-phase aqueous/iso-propyl alcoholic dimethyl ether solution (37.98% by weight of dimethyl ether, 55.02% by weight of water and 7.00% by weight of iso-propyl alcohol) and 1.09 g of carbon dioxide are injected through the spary valve into the aerosol container. A turbulent-spray head 10 is then placed onto the spray valve. The filled aerosol can is illustrated by FIG. 13.

Due to the use of a carrier mixture and of a device according to the invention, the spary properties of this aerosol filling largely correspond to the properties of corresponding hair-care products which have been formulated with the use of fluorochlorohydrocarbon propellants.

EXAMPLE 7

The formulation according to the data in Example 4 is prepared but—differing from that Example—the indicated quantity of bactericide, perfume oil, solubiliser and superfatting agent is dissolved beforehand, in a mixing tank, in the carrier mixture H which is still free from carbon dioxide. The mixture is then rejected into an aerosol container which is provided with a spray valve placed thereon, but without the turbulent-spray head 10. Subsequently, the indicated quantity of carbon dioxide is injected through the spary valve into the aerosol container. The turbulent-spray head 10 is then placed onto the spray valve.

The spray properties of this aerosol filling correspond to those of the filling according to Example 4.

EXAMPLE 8

The formulation according to the data in Example 5 is prepared. Differing from the latter, however, the procedure indicated in Example 7 is followed.

The spray properties of this aerosol filling correspond to those of the filling according to Example 5.

EXAMPLE 9

The formulation according to the data in Example 6 is prepared. Differing from the latter, however, the procedure indicated in Example 7 is followed.

The spray properties of this aerosol filling correspond to those of the filling according to Example 6.

TABLE II

Comparative data for the non-inflammable constituents in the aerosol preparation or carrier mixture to prove the technical advance achieved, taking into account German Offenlegungsschrift 2,705,872

| Example No. | 1 | 2 | 3 | 4 | 5 | 6 | 7 | 8 | 9 | 10 |
|---|---|---|---|---|---|---|---|---|---|---|
| State of the art, German Offenlegungsschrift 2,705,872, non-inflammable constituents in percent by weight | 37 | 40 | 38 | 36 | 31 | 25 | 18 | 35.2 | 35.2 | 25 |
| Carrier mixture according to the | A | B | C | D | E | F | G | H | I | J |
| invention, non-inflammable constituents in percent by weight | 70.8 | 70.8 | 70.8 | 55.0 | 55.0 | 55.0 | 55.0 | 55.72 | 55.0 | 55.52 |
| Example No. | 1 | 2 | 3 | 4 | 5 | 6 | 7 | 8 | 9 | |
| Aerosol preparations made from the carrier mixture according to the invention | 55.82 | 55.0 | 56.19 | 55.0 | 56.19 | 55.82 | 55.0 | 56.19 | 55.82 | |

When calculating the comparative data for the non-inflammable constituents, the following components were taken into account: (1) According to German Offenlegungsschrift No. 2,705,872: hair-spray resin, methylene chloride, water and 1,1,1-trichloroethane; the aluminium chlorohydroxide/propylene glycol complex contained in Example 10 was assumed to be non-inflammable to the extent of 50% by weight. (2) According to the present invention: hair-spray resin, water, carbon dioxide, bactericide, perspiration inhibitor and solubiliser. The above comparative data show that the present invention provides carrier mixtures or aerosol preparations which are improved by a major step-change since, according to the state of the art, 40% by weight of non-inflammable constituents are contained, in the most favourable case, in the aerosol preparation free from fluorochlorohydrocarbons, whilst the content of non-inflammable constituents is in all the Examples at least 55% by weight in the carrier mixture according to the invention.

We claim:

1. Pressurized carrier mixture for aerosol preparations of a self-propelling spray system, for use as a universal spray based on the active ingredients to be applied, organic solvents, water and propellants in a spray container, characterised in that the carrier mixture is present as a homogeneous solution consisting essentially of 70.0–50.1 percent by weight of water, 38.5–28.7 percent of weight of dimethyl ether, 0.5–10.0 percent by weight of iso-propanol and/or ethanol and/or n-propanol and 1.4–0.8 percent by weight of carbon dioxide wherein the percentage by weight data must add up to 100 percent by weight an in that the carrier mixture has a pressure of about 5 to about 7 bars at 20° C.

2. Carrier mixture according to claim 1, characterised in that it contains, as propellant gases, 0.8 to 1.1 percent by weight of carbon dioxide and 28.7-38.5 percent by weight of dimethyl ether, the percentages by weight relating to the total weight of the aqueous carrier mixture.

3. Carrier mixture according to claim 1, characterised in that it contains 54.0-70.0 percent by weight of water, the percentages by weight relating to the total weight of the aqueous carrier mixture.

4. Carrier mixture according to claim 1, characterised in that it contains 5.0-10.0 percent by weight of ethanol and/or iso-propanol and/or n-propanol, the percentages by weight relating to the total weight of the aqueous carrier mixture.

5. Carrier mixture according to claim 1, characterised in that it contains
54.0-55.0 percent by weight of water,
0.9-1.1 percent by weight of carbon dioxide,
38.5-35.1 percent by weight of dimethyl ether and
9.0-6.4 percent by weight of ethanol and/or iso-propanol and/or n-propanol, wherein the percentage by weight data must add up to 100 percent by weight.

6. Process for the manufacture of a carrier mixture according to claim 5 for ready-to-use aerosol preparations, characterised in that the active ingredients, water and organic solvents are processed to give a mixture and a requisite part quantity is filled into a pressure-spray container and the pressure-spray container is then closed so that, after dimethyl ether and then carbon dioxide have been filled in under pressure, the liquid filling is then present as a single-phase homogeneous solution.

7. Process for the manufacture of a carrier mixture according to claim 4 for ready-to-use aerosol preparations, characterised in that the active ingredients, water and organic solvents are processed to give a mixture and a requisite part quantity is filled into a pressure-spray container and the pressure-spray container is then closed so that, after dimethyl ether and then carbon dioxide have been filled in under pressure, the liquid filling is then present as a single-phase homogeneous solution.

8. Process for the manufacture of a carrier mixture according to claim 3 for ready-to-use aerosol preparations, characterised in that the active ingredients, water and organic solvents are processed to give a mixture and a requisite part quantity is filled into a pressure-spray container and the pressure-spray container is then closed so that, after dimethyl ether and then carbon dioxide have been filled in under pressure, the liquid filling is then present as a single-phase homogeneous solution.

9. Process for the manufacture of a carrier mixture according to claim 2 for ready-to-use aerosol preparations, characterised in that the active ingredients, water and organic solvents are processed to give a mixture and a requisite part quantity is filled into a pressure-spray container and the pressure-spray container is then closed so that, after dimethyl ether and then carbon dioxide have been filled in under pressure, the liquid filling is then present as a single-phase homogeneous solution.

10. Process for the manufacture of a carrier mixture according to claim 1 for ready-to-use aerosol preparations, characterised in that the active ingredients, water and organic solvents are processed to give a mixture and a requisite part quantity is filled into a pressure-spray container and the pressure-spray container is then closed so that, after dimethyl ether and then carbon dioxide have been filled in under pressure, the liquid filling is then present as a single-phase homogeneous solution.

* * * * *